March 20, 1951  F. O. LUENBERGER  2,545,855
VENTILATED DYNAMOELECTRIC MACHINERY
Filed Aug. 21, 1948  3 Sheets-Sheet 1
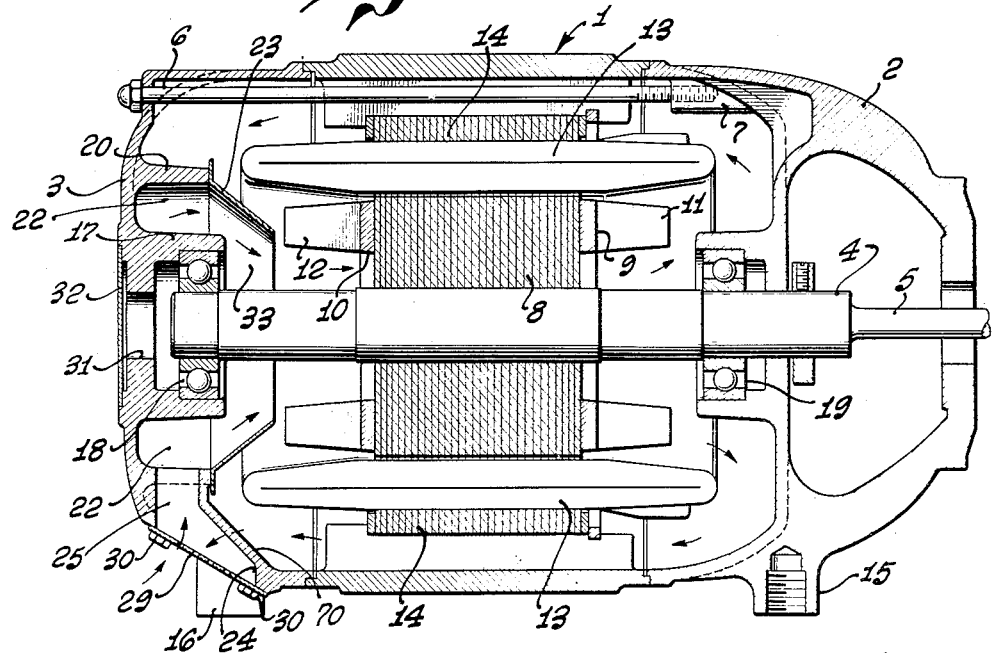
Fig. 1.
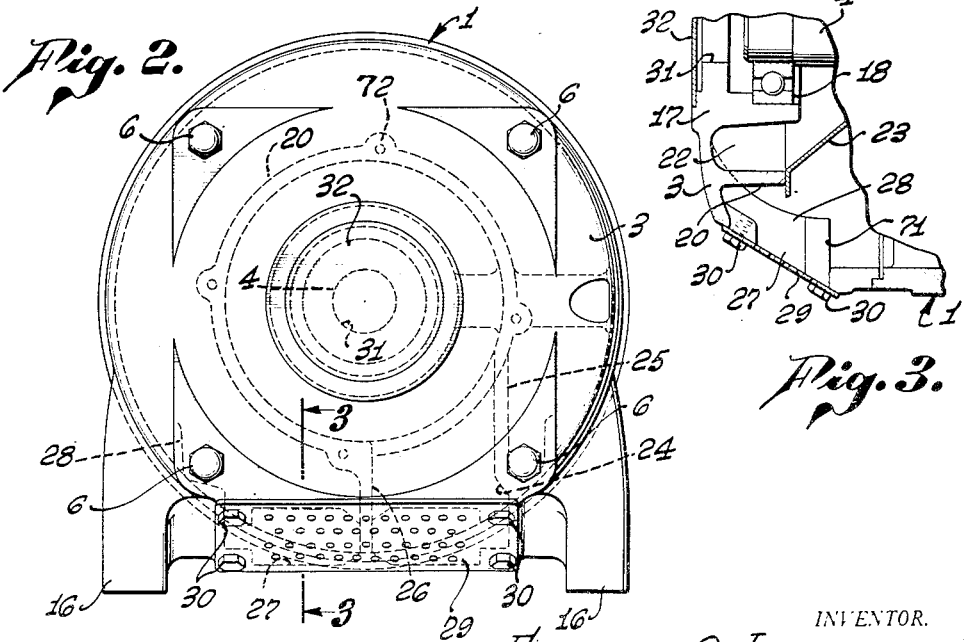
Fig. 2.
Fig. 3.
INVENTOR.
FREDERICK O. LUENBERGER,
BY
John Flam
ATTORNEY.

March 20, 1951     F. O. LUENBERGER     2,545,855
VENTILATED DYNAMOELECTRIC MACHINERY
Filed Aug. 21, 1948     3 Sheets-Sheet 2
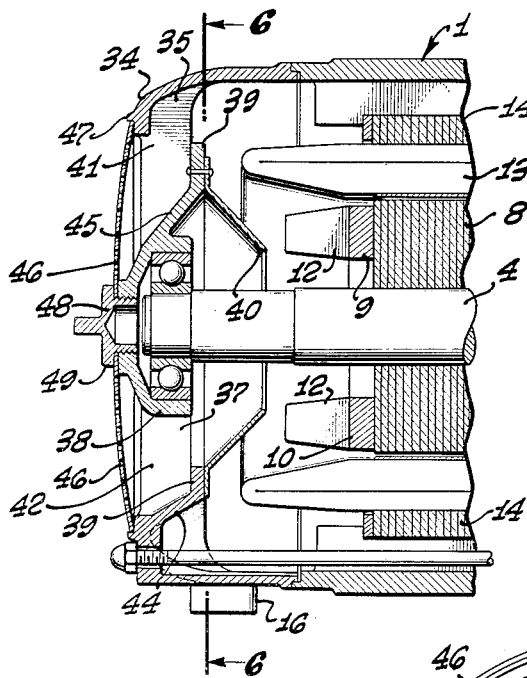
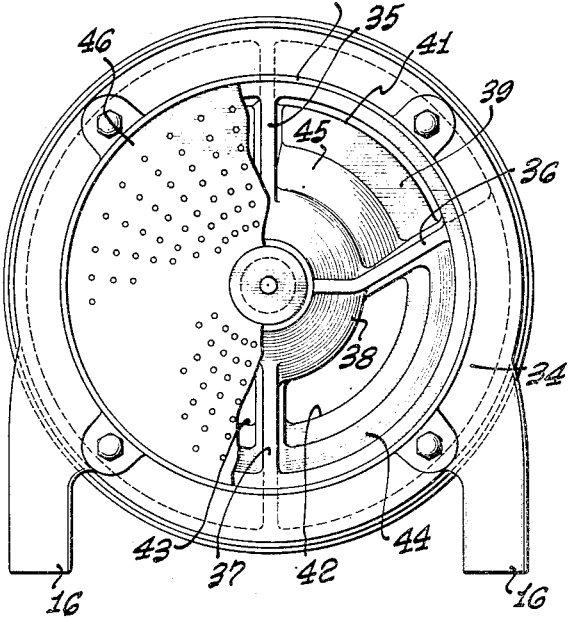
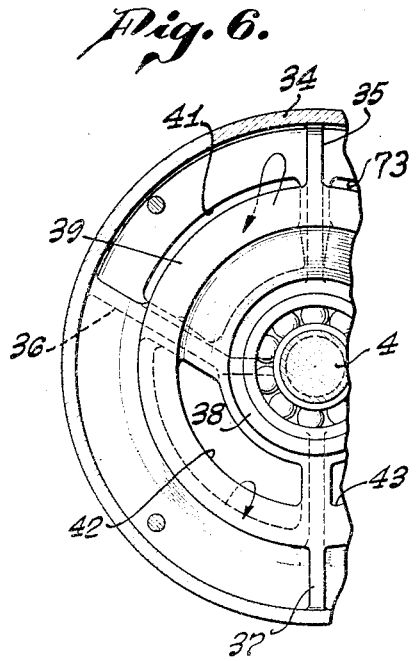
INVENTOR.
FREDERICK O. LUENBERGER,
BY John Flann
ATTORNEY.

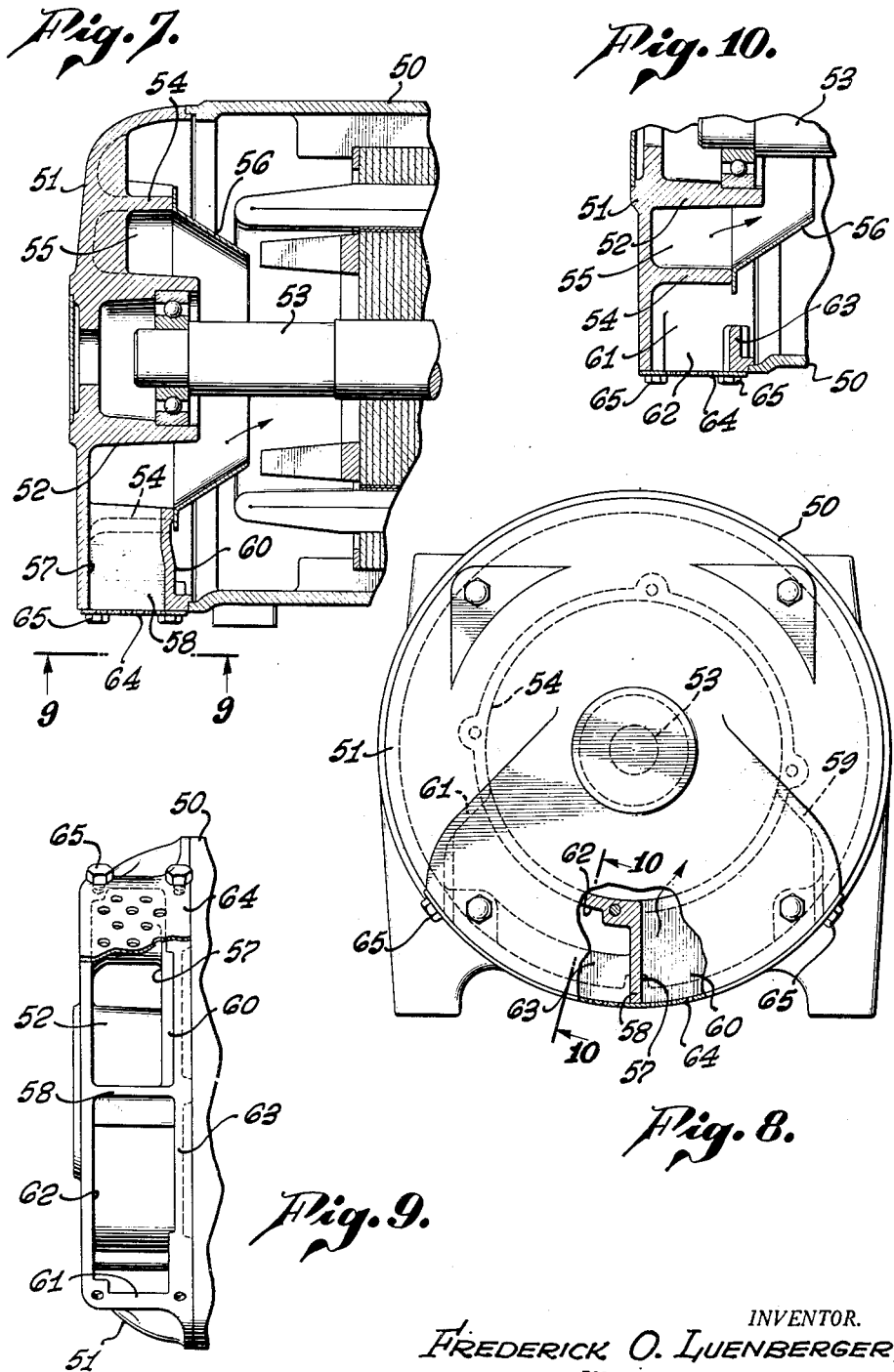

Patented Mar. 20, 1951

2,545,855

UNITED STATES PATENT OFFICE 2,545,855

VENTILATED DYNAMOELECTRIC MACHINERY

Frederick O. Luenberger, Los Angeles, Calif., assignor to U. S. Electrical Motors, Inc., Los Angeles, Calif., a corporation of California Application August 21, 1948, Serial No. 45,483

6 Claims. (Cl. 171—252)

This invention relates to the ventilation of dynamoelectric machinery, and particularly of induction motors.

Such motors usually are provided with fan blades mounted on the ends of the rotors, and intake and outlet openings for the cooling air are provided. These openings are placed at convenient locations on the frame of the motor, to ensure a circulation of air past the operating windings.

In some instances the drive end of the motor is built into inaccessible locations, without regard to ventilation openings.

It is one of the objects of this invention to provide a ventilating system in which the ventilating openings are rendered accessible from the end of the motor remote from the load.

In order to accomplish this result, both the inlet and outlet openings are disposed at one end of the motor, and proper deflecting means are provided to cause the air to circulate through the motor from one opening to the other.

It is accordingly another object of this invention to provide a simple circulating system in which the inlet and outlet openings are adjacent, whereby a single perforated screen can be used to cover both openings.

The air is emitted through a multiplicity of small openings in the screen that overlies the outlet opening. There is thus no danger that any substantial part of this heated air will reenter the inlet opening, since the small openings act as nozzles directing the air away from the openings.

It is therefore another object of this invention to provide a ventilating system for a motor that is efficient and practicable even when the inlet and outlet openings are quite close together.

This invention possesses many other advantages, and has other objects which may be made more clearly apparent from a consideration of several forms in which it may be embodied. Such forms are shown in the drawings accompanying and forming part of the present specification. These forms will now be described in detail, illustrating the general principles of the invention; but it is to be understood that such detailed description is not to be taken in a limiting sense, since the scope of the invention is best defined by the appended claims.

Referring to the drawings:

Figure 1 is a vertical sectional view, partly diagrammatic, of an induction motor incorporating the invention;

Fig. 2 is an end view thereof;

Fig. 3 is a fragmentary sectional view, taken along a plane corresponding to line 3—3 of Fig. 2;

Fig. 4 is a fragmentary vertical section, similar to Fig. 1, of a modified form of the invention;

Fig. 5 is an end view thereof, partly broken away;

Fig. 6 is a fragmentary sectional view, taken along a plane corresponding to line 6—6 of Fig. 4;

Fig. 7 is a view, similar to Fig. 4, of a further modified form of the invention;

Fig. 8 is an end view of the motor shown in Fig. 7, partly broken away;

Fig. 9 is a view taken from a plane corresponding to line 9—9 of Fig. 7, with the screen or cover broken away; and Fig. 10 is a fragmentary sectional view, taken along a plane corresponding to line 10—10 of Fig. 8.

In the form of the invention illustrated in Figs. 1, 2 and 3, a motor frame 1 is shown having an end bracket 2 at its right-hand end and an end bracket 3 at its left-hand end. These end brackets, together with the frame 1, enclose the operating parts of the induction motor.

The end brackets 2 and 3 rotatably support the shaft 4 having a driving end 5 adapted to be connected in any appropriate manner to a load at the right-hand side of the motor. The end brackets are attached to the frame 1 in any conventional manner as, for example, by the bolts 6 which project through appropriate apertures in the end bracket 3 and frame 1 and are threaded into bosses on the inside of the end bracket 2.

The motor includes the rotor 8 appropriately mounted on the shaft 4 and carrying a squirrel cage winding having the end rings 9 and 10 and fan blades 11 and 12. The stator of the motor includes the windings or coils 13 disposed in slots in the stator laminations 14 that are appropriately supported within the frame 1.

The motor may be appropriately supported by the aid of the threaded bosses 15 and 16 formed respectively on the end bracket 2 and the end bracket 3. The end bracket 3 is provided with an inner center boss or standard 17 accommodating a ball bearing structure 18 for rotatably supporting the shaft 4. A similar ball bearing structure 19 is provided in the end bracket 2.

Surrounding the boss 17 is an annular rib 20, formed on bracket 3. This annular rib defines an annular space 22 between it and the bearing standard or boss 17. Supported on the inner edge of the rib 20 there is a deflector 23 which may be made from sheet metal and of hollow conical form. This deflector 23 converges toward the right in order to lead ventilating air from the space 22 to the interior of the motor. It may be attached to the rib 20 as by one or more screws 72 shown in dotted lines in Fig. 2.

Ventilating air is drawn into the interior of the deflector member 23 from the annular space 22 through a passage 24 that leads downwardly from the space 22. As shown most clearly in Fig. 2, this passage extends between a pair of ribs 25 and 26, joined to rib 20. These are generally parallel and extend downwardly from the annular space 22 to the lower part of the bracket 3. Rib 26 is substantially radial of the shaft 4. The rib 20 has an appropriate aperture communicating with the space between the ribs 25 and 26. A rear sloping wall 70 extends below rib 20 and serves with ribs 25 and 26 to define the passage 24. This passage has a downwardly sloping opening at the exterior of the bracket 3. The wall 70 extends upwardly from the lower edge of this opening. An outlet passage or opening 27, shown most clearly in Fig. 3, is also formed in bracket 3. This opening 27 is adjacent the inlet opening 24 and is at the left of the rib 26 as viewed in Fig. 2. This opening is defined by the rib 26, another rib 28, and a rear wall 71 extending from the lower edge of the opening 27. The opening 27 is similar in arrangement and in extent to the opening 24 and slants in the same manner.

A perforated metal screen 29 covers both opening 24 and 27. It may be attached to the exterior of bracket 3, as by the aid of the bolts or screws 30.

The end bracket 3 has a through aperture 31 which may be closed by sheet metal disc 32 disposed in an appropriate recess in the outer surface of the bracket 3.

The path of the ventilating air can be traced from the exterior through the screen 29, as shown by the arrows 33, into the space 22, thence axially past the motor windings and thence in a reverse direction to the outside of the deflector 23 and thence the outlet opening 27. Since the inlet and outlet openings for the ventilating air are adjacent, it is practicable to employ a single screen 29 to cover both openings. Furthermore, the ventilating air enters the motor through an annular space 22 and into the inside of the deflector 23. The exit of the air is effected through a passage exterior of the deflector 23. Although the openings 24 and 27 are quite close together, there is no material danger that the heated air at the outlet will be recirculated. This is due to the fact that the perforations in the covering screen 29 cause the air to travel outwardly a considerable distance from the openings.

By the aid of this construction it is possible to place the motor quite closely to its load at the right-hand end, and without in any way interfering with the free flow of ventilating air.

In the form of the invention shown in Figs. 4, 5, and 6, the motor elements and the fan elements are substantially the same as heretofore described.

The end bracket 34 is appropriately attached to the frame 1 in a manner similar to that shown in Fig. 1. Furthermore, it has four sector-like openings defined by ribs or vanes 35, 36, and 37. These vanes or ribs extend generally radially of the bracket between the outer edge thereof and the bearing boss 38 which serves to support the shaft 4. Extending around the outside of the bearing boss is an annular flange 39 for supporting the conical deflector 40.

The two upper openings 41 and 73 serve as outlet openings communicating with the space exterior of the deflector 40. The two lower openings 42 and 43 serve as inlet openings to the interior of the deflector 40. A sloping wall 44 is formed from the outer edge of this opening inwardly to join and to support the flange 39. Similarly, a sloping wall 45 projects outwardly from the bearing standard 38 in the spaces 41 and 73 to support the flange 39.

By this means the inlet openings 42 and 43 extend into the deflector 40; and outlet openings 41 and 73 are in communication with the exterior of the deflector 40.

A perforated screen 46 is disposed over all of the openings and may be in the form of a disc that is slightly dished. The edges of the disc are appropriately accommodated within the flange 47 on the outside of the bracket 34. The disc thus serves to cover all of the ventilating openings in the bracket 34. It may be held appropriately in place by the aid of a hollow threaded screw 48 extending through the center of the disc and having an enlarged head 49 extending beyond the edge of the central aperture of the perforated disc 46. This screw 48 is appropriately accommodated in a threaded aperture communicating with the interior of the bearing standard 38.

In the form of the invention illustrated in Figs. 7, 8, 9, and 10, the motor frame 50 is of similar structure to that illustrated in the previous figures. The end bracket 51, as before, has a central bearing standard boss 52 for rotatably supporting the lower shaft 53. Surrounding this boss 52 is an annular rib or vane 54 defining an annular space 55. This vane 54 serves to support the deflector 56.

As shown most clearly in Fig. 8, the vane or rib 54 is interrupted to define an inlet opening 57 directed radially outwardly from the space 55. This passage or opening is defined by the ribs 58 and 59 and a wall 60 placed in the rear of bracket 51.

The outlet passage 62 is formed between the rib or vane 58 and a rib or vane 61, as well as by the rear wall 63. The upper edge of this rear wall is spaced below the rib or vane 54 to permit the exit of air from the outside of the deflector 56 into the passageway 62.

An arcuate screen cover 64 extends over both the openings 57 and 62 and is held appropriately in place on the exterior periphery of the bracket 51, as by the aid of the screws 65.

In this instance, the screened openings are located on a substantially cylindrical exterior surface of the bracket 51. They are adjacent each other and can conveniently be covered by a single screen cover member 64.

The inventor claims:

1. In a dynamo-electric machine having a frame, a stator supported by the frame, a shaft, and a rotor mounted on the shaft; an end bracket mounted on the frame; said bracket having a bearing boss extending inwardly of the bracket; a bearing structure for the shaft mounted in the boss; said bracket having an outer annular wall and an inner annular wall, said walls forming an outer annular air passage; said boss and inner wall forming an inner annular air passage; said bracket also having spaced ribs extending across the outer annular passage and defining a passageway to the inner annular passage; said outer annular wall having an opening to the exterior of the bracket; an air deflector supported on the inner wall; another end bracket for closing the frame at the opposite end; and means carried by the rotor for causing air to be drawn through the inner annular passage into the frame, and to be expelled through the outer annular passage.

2. In a dynamo-electric machine having a frame and a shaft: a rotor having fan blades at the ends thereof; one bracket sealing the shaft end of the machine; a second bracket providing ventilating apertures for the machine, having an inwardly projecting boss centrally thereof, an axially extending annular rib on said second bracket surrounding said boss and defining together with said boss an annular channel, a substantially radially extending first wall member leading from said rib to the periphery of said second bracket, a second wall member leading from said rib to the periphery of said second bracket, a wall member cooperating with said first and second wall members together with said second bracket to define an inlet passageway leading to said channel, there being an aperture in said rib as well as an opening in the periphery of said bracket so that said inlet passageway communicates with said channel, a third wall member leading from said rib to the periphery of said bracket, said first wall member and said third wall member together with said bracket defining an outlet passageway communicating with the exterior portion of said rib, there being a second opening on the periphery of said bracket adjacent said first opening; perforated metal overlying both said first and second openings; and a conical deflector mounted on said rib and converging in an axial direction toward said rotor.

3. In a dynamo-electric machine having a frame and a shaft: a rotor having fan blades at the ends thereof; one bracket sealing the shaft end of the machine; another bracket providing ventilating apertures for the machine, having an outer peripheral wall as well as a bearing boss defining an inner wall, said other bracket also having radially extending ribs joining said walls, said other bracket having a wall joined to the boss and extending radially outwardly between some of the pairs of ribs to define, together with said ribs and said outer peripheral wall, outer openings, said other bracket also having a wall joined to the outer peripheral wall and extending radially inwardly between other pairs of ribs to define, together with said ribs and said inner wall, inner openings; an axially extending conical deflector mounted on said bracket and converging toward said rotor, defining inlet and outlet passageways with said inner and outer openings, said passageways leading respectively to the interior of said deflector and the exterior thereof; and a perforated screen overlying said openings secured to said bracket.

4. In a dynamo-electric machine having a frame, a rotor, and a shaft extending through one end of same frame: a fan blade for each end of said rotor and carried by said rotor; a pair of end brackets, one bracket sealing the shaft end of said machine; a frusto-conical annular deflector mounted interiorly of the other end bracket and terminating adjacent one of said fan blades; and wall means forming adjacent inlet and outlet openings through said other bracket to the interior of said machine, said openings communicating respectively with the interior and exterior portions of said deflector; said openings, deflector, and said end brackets forming an air passageway for flow of air through said inlet, the interior of said deflector, substantially axially in one direction through said rotor, radially outwardly at the said one end bracket, substantially axially in the other direction exteriorly of said rotor, about the exterior of said deflector, and through said outlet.

5. In a dynamo-electric machine having a frame, a rotor, and a shaft extending through one end of said frame: a fan blade for each end of said rotor and carried by said rotor; a pair of end brackets, one bracket sealing the shaft end of said machine; a frusto-conical annular deflector mounted interiorly of the other end bracket and terminating adjacent one of said fan blades; wall means forming adjacent inlet and outlet openings through said other bracket to the interior of said machine, said openings communicating respectively with the interior and exterior portions of said deflector; said openings, deflector, and said brackets forming an air passageway for flow of air through said inlet, the interior of said deflector, substantially axially in one direction through said rotor, radially outwardly at the said one end bracket, substantially axially in the other direction exteriorly of said rotor, about the exterior of said deflector, and through said outlet; and a member overlying said inlet and outlet, said member having a plurality of spaced apertures providing a plurality of restricted orifices over said inlet and outlet respectively.

6. In a dynamo-electric machine having a frame, a rotor, and a shaft extending through one end of said frame: a fan blade for each end of said rotor and carried by said rotor; a pair of end brackets, one bracket sealing the shaft end of said machine; a bearing boss carried by said other bracket; said other bracket having wall means forming an arcuate inlet opening to the interior of said machine, said opening extending from said bearing boss to an intermediate radial distance from the center of said bearing boss, said other bracket also having wall means forming an arcuate outlet opening from the interior of said machine, said outlet opening being angularly spaced from said arcuate inlet opening, and extending outwardly from said intermediate radial distance; and a frusto-conical annular deflector mounted interiorly of the said other end bracket at said intermediate radial distance thereon, said inlet opening communicating with the interior of said deflector, and said outlet opening communicating with the exterior of said deflector, said deflector terminating adjacent one of said fan blades; said openings, deflector, and said end brackets forming an air passageway for flow of air through said inlet, the interior of said deflector, substantially axially in one direction through said rotor, radially outwardly at the said one end bracket, substantially axially in the other direction exteriorly of said rotor, about the exterior of said deflector, and through said outlet.

FREDERICK O. LUENBERGER.

REFERENCES CITED

The following references are of record in the file of this patent:

UNITED STATES PATENTS

| Number | Name | Date |
|---|---|---|
| 2,294,586 | Troller | Sept. 1, 1942 |
| 2,357,923 | Anderson | Sept. 12, 1944 |
| 2,457,994 | Formhals | Jan. 4, 1949 |

FOREIGN PATENTS

| Number | Country | Date |
|---|---|---|
| 139,066 | Great Britain | Feb. 26, 1920 |
| 383,674 | Great Britain | Nov. 24, 1932 |
| 313,823 | Germany | July 26, 1919 |
| 502,059 | Germany | Mar. 26, 1931 |